INVENTORS
NOBUMASA OHOSHIMA
EIICHI SUGI

INVENTORS
NOBUMASA OHOSHIMA
EIICHI SUGI

United States Patent Office 3,446,550
Patented May 27, 1969

3,446,550
FILM EDITING APPARATUS WITH REVERSIBLE IMAGE INTENSIFIER
Nobumasa Ohoshima, Hirakata-shi, Osaka-fu, and Eiichi Sugi, Moriguchi-shi, Osaka-fu, Japan, assignors to Matsushita Electric Industrial Co., Ltd., Osaka, Japan
Filed Nov. 7, 1966, Ser. No. 592,470
Claims priority, application Japan, Nov. 5, 1965, 40/68,658; Dec. 29, 1965, 41/210; Jan. 27, 1966, 41/5,074; Aug. 2, 1966, 41/51,454
Int. Cl. G03b *41/02, 21/00*
U.S. Cl. 352—105                                  13 Claims

ABSTRACT OF THE DISCLOSURE

A film editing apparatus capable of directly intensifying an image or transmitting a negative of an image and intensifying the image, the apparatus comprising an image converting panel consisting of a glass plate, a first transparent electrode on the glass plate, an electroluminescent layer having an electroluminescent material on the first transparent electrode, a reflective layer on the electroluminescent layer, an opaque layer on the reflective layer, a photoconductive layer containing photoconductive material having a response time lower than 50 msec. on the opaque layer, a parallel grid electrode embedded in the photoconductive layer, a transparent dielectric layer having a transparent film therein on the photoconductive layer, second transparent electrode on the dielectric layer, and a second glass plate on the second transparent electrode. Associated with the panel are optical devices for shining an image from a film onto the panel, driving mechansim for moving the film through the apparatus and rewinding it, a power supply for the panel, and associated controls for the various elements.

---

This invention relates to a film editing apparatus which directly intensifies an image or converts a negative image into a positive image or a positive image into a negative image while intensifying the image, and more particularly to a film editing apparatus comprising a solid state image converting panel formed of three principal integrated layers, an electroluminescent layer, a photoconductive layer and a transparent dielectric layer.

For convenience, said solid state image converting panel will hereinafter be referred to simply as an image converting panel throughout the specification and claims.

A conventional film editing apparatus comprises optical means for enlarging filmed images on a screen, a light source, and mechanical means for carrying the film past the optical means and for rewinding the thus conveyed film. The enlarged pictures are projected on frosted glass and the image is the same as that on the film as regards whether it is a negative or positive image. It has been difficult for conventional editing apparatus to obtain enlarged pictures with entirely satisfactory brightness, resolution and clarity. Negative films such as various films for television system are occasionally reprinted as positive films prior to editing. If there is no available time to reprint, the negative films themselves must be edited by viewing negative images which prevent an exact inspection of detailed pictures and facial expression of the people in the films. Editing of negative films requires a special skill and is tiresome work which harms the eyes and tires the people doing the editing.

In order to eliminate these disadvantages, there has been devised a film editing apparatus in which enlarged positive images can be reproduced from negative films on a cathode-ray tube (called a Braun tube) by employing an industrial television system provided with a vidicon. The film editing apparatus using an industrial television system is apt to be large and have a complicated construction, which causes it to be high in cost and to be difficult to operate and repair. The reproduced pictures also are apt not to be uniform with respect to the brightness, resolution and clarity as between the center part and the peripheral edge parts. Therefore, as a practical matter, the film editing apparatus using an industrial television system is not used very widely, and instead film editing apparatus which does not convert the negative images on the film into positive images is widely used.

An object of this invention is to provide a film editing apparatus which converts a negative image on a film into an enlarged positive, or converts a positive image on a film into an enlarged negative image, which images are projected on an image converting panel.

A further object of this invention is to provide a film editing apparatus in which the reproduced enlarged images are characterized by high brightness, high clarity and high resolution.

A further object of this invention is to provide a film editing apparatus having a construction which is more easily operated and repaired, if necessary, than is a conventional reversible editing apparatus.

Another object of this invention is to provide a film editing apparatus characterized by a simple construction yet which is lower in cost than conventional reversible editing apparatus.

These and other objects will be apparent from the following description taken together with the accompanying drawings, wherein.

Figure 3:
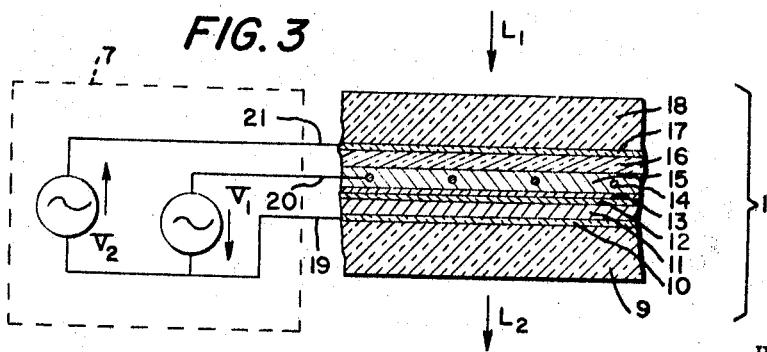
FIG. 3 is a cross sectional view of an image converting panel adapted for use in the film editing apparatus in accordance with the invention.

Before proceeding with a detailed description of the novel film editing apparatus according to the invention, the image converting panel will be explained with reference to FIG. 3 of the drawings, wherein reference character 1 designates, as a whole, an image converting panel comprising, as its active elements, an electroluminescent layer 11, a photoconductive layer 15 and a transparent dielectric layer 16, said layers having great effects on the images produced directly or in reversely intensified form on the surface of said image converting panel. Said electroluminescent layer 11 is superposed on a first transparent electrode 10 applied to a glass plate 9 and is followed by layers consisting of a reflection layer 12 and an opaque layer 13. Said photoconductive layer 15 has therein a parallel grid electrode 14 and is superposed on said opaque layer 13. Said transparent dielectric layer 16 is positioned on said photoconductive layer 15 and is followed by a second transparent electrode 17 applied to a glass plate 18. Said first electrode and second electrode are connected to lead wires 19 and 21, respectively, so as to provide for the application of an AC voltage from voltage source $V_2$ across said two transparent electrodes. Said parallel grid electrode 14 is connected to a lead wire 20 so as to provide for the application of an AC voltage from voltage source $V_1$, which is connected to lead wire 19, across said parallel grid electrode 14 and said first transparent electrode 10.

The novel image converting panel can be prepared by painting techniques, such as spray and screen methods, which are well known. Both transparent electrodes 10 and 17 can be a tin oxide film chemically deposited on the glass plates 9 and 18 and having a thickness of from 3 to 5 mm. The tin oxide film can be covered by an electroluminescent paint to form the electroluminescent layer 11, the paint consisting of electroluminescent powder such as activated ZnS and a binder such as urea resin in a solvent such as xylol or butanol. The operable thickness of said electroluminescent layer 11 is 30 to $40\mu$.

The reflective layer 12 is prepared by applying, on said electroluminescent layer 11, a paint comprising $BaTiO_3$ powder having a particle size of from 2 to $8\mu$ and a binder such as urea resin in a solvent such as xylol or butanol. A paint comprising carbon black powder and a binder such as epoxy resin in a solvent such as butanol and methylethyl ketone is applied to said reflective layer 12 for forming said opaque layer 13, said opaque layer having a thickness of 10 to $15\mu$.

Thin metal wires 14 are arranged parallel to each other in the photoconductive layer 15 superposed on said opaque layer 13, and are fixed at both ends. One end is connected to a copper electrode for electrical connection to a lead wire 20. An example of metal wires which are operable is tungsten wires having a diameter of 5 to $15\mu$. The fixed metal wires are covered by a thin photoconductive layer 15 which is a mixture of photoconductive powder such as CdS or CdSe or a solid solution thereof and a binder such as epoxy resin in a solvent such as butanol and methyl-ethyl ketone, and this layer can be applied in a thickness of from 50 to $60\mu$ by, for example, a silk screen stencil method. The transparent dielectric layer 16 having a thickness of 25 to $80\mu$ can be prepared by sandwiching a transparent thin film such as a polyester film between transparent dielectric adhesive material layers such as silicon rubber or silicon resin. To said transparent adhesive is adhered the second transparent electrode 17 which is a thin tin oxide film formed on the glass plate 18. It is important to cure the various binders and adhesive at a temperature lower than 150° C. because a higher curing temperature results in a severe impairment of the properties of the resultant image converting panel. The lead wires 19, 21 and 20 can be connected to the transparent electrodes 10 and 17 and the parallel grid electrode 14, respectively by using, for example, electrically conductive adhesive such as the silver paint named "Condyne" manufactured by Matsushita Electric Industrial Co., Ltd.

Figure 4:
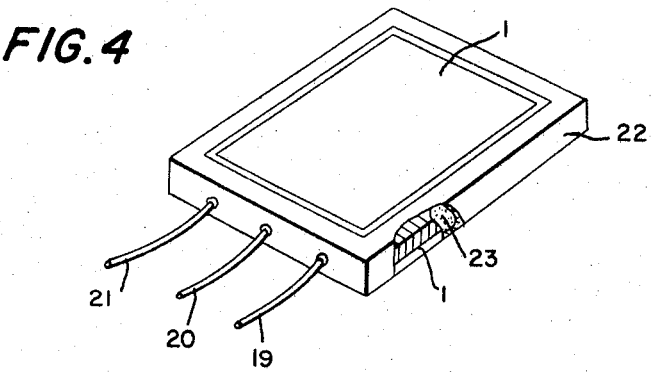
FIG. 4 is a perspective view of an image converting panel of FIG. 3 mounted in a frame.

Referring to FIG. 4, said image converting panel 1 is mounted in a plastic frame 22 with said lead wires 19, 20 and 21 extending out through the edge of said frame 22. The space between said image converting panel 1 and said frame 22 is filled with resin adhesive 23 or wax having a high resistance to humidity.

An explanation of direct and reverse intensification of images projected on the image converting panel 1 will be given with reference to FIG. 3. A light input $L_1$ passing through the glass plate 18, the second transparent electrode 17 and the transparent dielectric layer 16 produces an impedance pattern in the photoconductive layer 15 with the impedance being less the more intense the light. The impedance pattern is divided into finely divided portions by parallel grid electrode. When said first transparent electrode 10 and second transparent electrode 17 are in an open circuit condition, i.e. voltage $V_2$ is not applied across them, and at the same time the AC voltage $V_1$ is applied across the parallel grid electrode 14 embedded in the photoconductive layer 15 and the first transparent electrode 10, an electric current passes through the photoconductive layer 15, the opaque layer 13, and reflective layer 12 and reaches the electroluminescent layer 11.

The portions of the pattern having a low impedance permit a high electric current flow into the electroluminescent layeer 10 and vice versa. Therefore, pictures projected on the photoconductive layer 15 can be directly reproduced on the electroluminescent layer 11 in an intensified condition.

On the other hand, when said first electrode 10 and said parallel grid electrode 14 are short circuited and simultaneously the AC voltage $V_2$ is applied between said two transparent electrodes 10 and 17, the electric current at the portions having an extremely low impedance flows through the parallel grid electrode 14 into the lead wire 20 and the electric current at the portions having an extremely high impedance flows through the opaque layer 13 and the reflective layer 12 into the electroluminescent layer 11. The portions having medium impedance are provided with electric current which flows into both the lead wire 20 and the electroluminescent layer 11. The ratio of electric current, at a given portion, i.e. that flowing into the electroluminescent layer 10 to that flowing into the lead wire 20, increases with an increase in the impedance. In such a way the electroluminescent layer 11 will produce an intensified negative of the image projected on the photoconductive layer 15, i.e. will produce an image in reversely intensified form.

The opaque layer 13 prevents the photoconductive layer 15 from being influenced by the images reproduced on the electroluminescent layer 11. The dielectric breakdown voltage of said electroluminescent layer 11 can be improved by the provision of the reflective layer 12.

The images reproduced directly or in reversely intensified form on the electroluminescent layer 11 vary in brightness with the voltage and frequency of the applied AC voltages $V_1$ and $V_2$ in addition to varying with the characteristics of the image converting panel. The contrast of reproduced images can be greatly improved by simultaneous application of said AC voltages $V_1$ and $V_2$ which are in reverse phase with respect to each other.

Referring again to FIG. 3 an AC voltage $V_1$ is applied across said lead wires 19 and 20 and an AC voltage $V_2$ is applied across said lead wires 19 and 21. An image projected as the light input $L_1$ on said photoconductive layer 15 through the glass plate 18, the transparent electrode 17 and the transparent dielectric layer 16 can be reproduced on the surface of said electroluminescent layer 11 and the light output $L_2$ intensified when said lead wires 19 and 21 are in an open circuit connection and at the same time an AC voltage $V_1$ of 150 to 600 v. at a frequency of from 1 to 10 kc./sec. is applied across said lead wires 19 and 20. Reproduced images having a more satisfactory contrast can be obtained by supplying a voltage $V_1$ of 150 to 600 v. at a frequency of 1 to 10 kc./sec. and at the same time supplying a voltage $V_2$ of 0 to 800 v. that is opposite in phase to the voltage $V_1$ to terminals 19 and 21.

When said lead wires 19 and 20 are short circuited and at the same time said lead wires 19 and 21 are supplied with an AC voltage $V_2$ of 400 to 1800 v. at a frequency of 1 to 10 kc./sec., the image projected on the surface of said photoconductive layer 15 is in the reversely intensified form when it is reproduced at the surface of said electroluminescent layer 11. The reversely intensified image can be improved greatly by applying the voltage $V_2$ of 400 to 1800 v. at a frequency of 1 to 10 kc./sec. and at the same time applying a voltage $V_1$ of from 0 to 800 v. and in the opposite phase to the voltage $V_2$.

Both the directly intensified images and the reversely intensified images can be improved in the brightness, resolution and clarity by the novel film editing apparatus set forth hereinafter in accordance with the invention.

Figure 1:
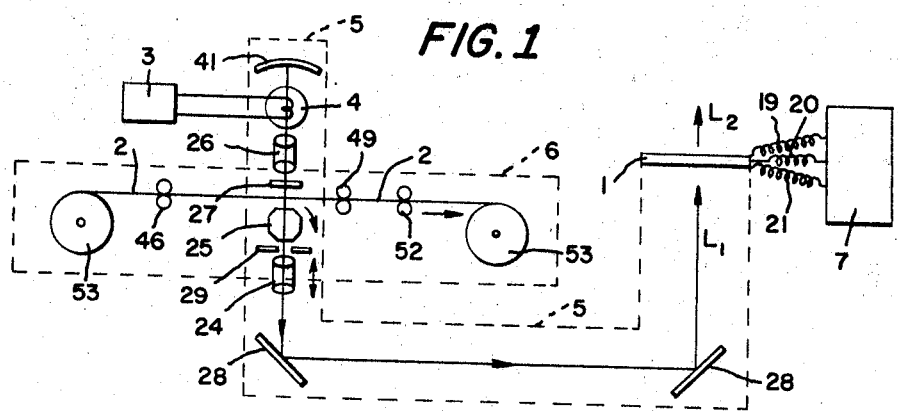
FIG. 1 is a schematic diagram of a film editing apparatus according to the invention.

Referring to FIG. 1, reference character 1 designates the aforesaid image converting panel which is connected to a power source 7 for supplying necessary AC voltages $V_1$ and $V_2$ through lead wires 19, 20 and 21 to the image converting panel 1, and an optical means 5 is provided for enlarging the images on film 2 and projecting the enlarged images on the surface of said image converting panel 1. Said film 2 is transferred and rewound by film rolling means 6 so as to pass through a definite location in said optical means 5. A light source 4 mounted in said optical means 5 is controlled as to the light intensity thereof by a light intensity controller 3.

In the novel film editing apparatus outlined above, it is important that said image converting panel 1 be constructed so as to achieve a high brightness, high resolution, high response, and entirely satisfactory tones of the reproduced images, and that said optical means 5 has a construction which will promote the desirable characteristics of said image converting panel 1. In addition to these considerations, said power source 7 must have a construction which will permit simple and convenient operation for controlling the voltages $V_1$ and $V_2$.

The speed with which the reproduced images are reproduced depends upon the photoconductive response time of the photoconductive materials of the photoconductive layer 15. Conventional photoconductive materials such as CdS and modified compositions thereof have a response time of 400 to 700 msec. and are apt to leave residual images on the image converting panel when they are used in the reproduction of moving pictures on a film transferred at a rate of 24 frames per second. It is necessary for eliminating the undesirable residual images that said photoconductive materials have a short response time which results in a quick variation in the photocurrent with respect to time after the photoconductor is irradiated or the light is off. On the other hand, photoconductive CdSe is known to have a response time less than about 50 msec. and thus has a photosensitivity suitable for the image converting panel. It has been discovered according to the invention that a solid solution of CdS in CdSe is entirely satisfactory both with respect to the response time and the photosensitivity. A range of compositions of the solid solution which has been found to be satisfactory is a solution of 100 to 65% by weight of CdSe and 0 to 35% by weight of CdS. An increase in the amount of CdS results in an increase in the photosensitivity and in the response time. A preferred range of compositions of said solid solution is 100 to 80% by weight of CdSe and 0 to 20% by weight of CdS.

Said photoconductive CdSe or a solid solution thereof with CdS can be made by a method well known in the art. A mixture of CdSe powder and CdS powder in the percentages by weight described above is heated at a temperature of from 500 to 800° C. in a non-oxidizing gas such as argon or nitrogen. The heated mixture is ground into finely divided powder and is immersed in an aqueous solution of $CdCl_2$, $CuCl_2$ and $NH_4Cl$. The immersed powder is dried and is subjected to an activation treatment in which the dried powder is heated at a temperature of from 500 to 600° C. in a non-oxidizing gas such as nitrogen or argon.

The characteristics of the reversed images produced by the apparatus according to the invention are strongly affected by the aforesaid transparent dielectric layer 16. It is necessary that the dielectric strength be as high as possible, and the dissipation factor (tan $\delta$) and the thickness be as low as possible. Reversed images which are superior in brightness and contrast can be obtained by a transparent dielectric layer 16 that is constructed of films of transparent dielectric materials such as silicon resin or silicon rubber having sandwiched between them a transparent insulating film such as polyethylene terephthalate film or polycarbonate film having a thickness of about $25\mu$. The overall thickness of such a transparent dielectric layer 16 is less than about $80\mu$ and a thickness of 25 to $45\mu$ can be entirely satisfactory with respect to the brightness and contrast of the reversed images and can provide a dielectric strength which gives a satisfactory operational life to the image converting panel.

The resolution of reproduced pictures can be improved by controlling the particle size of the aforesaid photoconductive powder such as CdSe or the solid solution of CdS in CdSe and of aforesaid electroluminescent powder such as ZnS, and by smoothly flattening each surface of the various layers of the image converting panel. In addition, the resolution can also be improved by a proper arrangement of the parallel grid electrode 14. It is preferable that the parallel wires be as thin as possible and be spaced from each other a distance which is as small as possible. The particle size of the electroluminescent powder and the photoconductive powder should be less than $10\mu$ and a preferred average particle size is from 5 to $8\mu$. The parallel grid electrode 14 can be made from tungsten wires about 5 to $15\mu$ in diameter and spaced at distances of from 300 to $600\mu$ from each other. In such a way reproduced pictures can be provided with a resolution as high as 10 to 20 line pairs per mm.

When the photoconductive material used for the novel image converting panel is a solid solution of CdS in CdSe having a satisfactory response time and photosensitivity, the material has a characteristic spectral response which lies between the spectral response of CdS and that of CdSe. In the optical means 5 for the novel film editing apparatus according to the invention, it is therefore important that the spectral response of the optical means match that of said solid solution, or match that of CdSe when the photoconductive layer is only CdSe.

Referring again to FIG. 1, reference character 5 designates, as a whole, the optical means and 4 is a light source coupled with a light intensity controller 3 which controls the electric current flowing through said light source 4. The light from said light source is intensified by light converging mirror 41 and enters a condenser lens 26. The condensed light is filtered by a heat-arresting filter glass 27, which eliminates wave lengths longer than $0.8\mu$, and it then passes through film 2 for copying the image on the film. After passing through the film 2, the light enters a projecting lens 24 through a synchronous turning prism 25 while being controlled as to its intensity by a control means in the form of an iris diaphragm 29. Said synchronous turning prism 25 rotates synchronously with the moving film 2. Finally the light is reflected by reflection mirrors 28 and reaches said image converting panel as a light input $L_1$.

Figure 5:
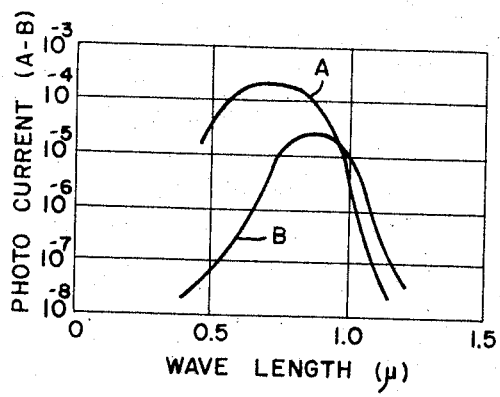
FIG. 5 is a graph illustrating the spectral response of photoconductive CdS (curve A) and photoconductive CdSe (curve B)

The spectral response of CdS and CdSe is illustrated by curves A and B, respectively, in FIG. 5. It will be obvious that CdS has an effective spectral response ranging from 0.4 to $1.0\mu$, while CdSe has an effective spectral response ranging from 0.7 to $1.2\mu$. The effective spectral response of a solid solution of these two compounds lies between the curves A and B and ranges from 0.6 to $1.1\mu$.

Therefore, it is preferable to use as various components of said optical means 5 those which do not cut off the effective wave length of the photoconductive materials, i.e. CdSe and said solid solution, and do not pass light with a wave length higher than 1.1μ for protecting the film from over heating. Commercially available lenses and prisms are able to transmit the light of necessary wave lengths, whereas a heat-arresting filter glass and a condenser lens are apt to have a narrow range of transmission of light. According to the invention, if a heat-arresting filter 27 is not used the film 2 should be protected from over-heating by air-cooling achieved by a fan. In place of a commercially available condenser lens, there is used a custom produced condenser lens which is not heat-arresting and has a wide transmission range. The custom made condenser lens is made, for example, by Ichizuka Optical Co., Ltd.

It is preferable to employ a light source 4 which has a spectral response which coincides with that of said photoconductive materials. A suitable light source can be selected from among the following: a tungsten lamp (catalog No. KP-8, 75 to 100 w. at 100 v.; Kondo Electrical Industrial Co., Ltd.) a xenon lamp (catalog No. UXL-75D, 100 w. at 15 v.; Division of Ushio Kogyo Kaisha Ltd.) or an iodine lamp (catalog No. JD-12-100, 100 w. at 12 v.; Division of Ushio Kogyo Kaisha Ltd.). A strobe lamp (catalog No. S-3A, Sugawara Laboratories Inc.) may also be used as a light source 4 when a heat-arresting filter glass 27 formed of a special filter glass (catalog No. V-VIB, Tokyo Shibaura Electric Co., Ltd.) which has a high transmission range between 0.6μ to 1.1μ is used. The high intensity of light from the strobe lamp can compensate for any loss in light intensity caused by said filter glass.

Figure 6:
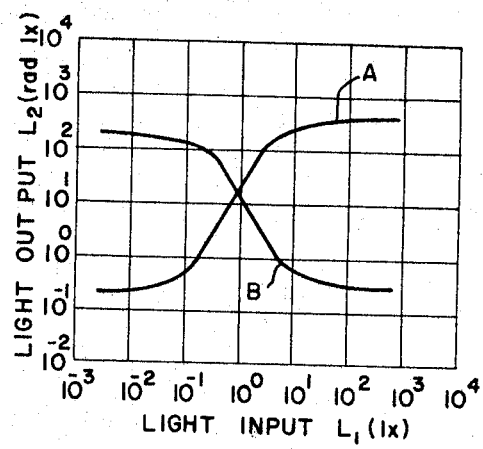
FIG. 6 is a graph illustrating the relation between the intensity of light input and light output for a directly intensified image (curve A) and the relation between the intensity of light input and light output for an image in reversely intensified form (curve B) using the image converting panel.

The magnitude of intensification of the reproduced pictures on said image converting panel depends upon the light input, as shown in FIG. 6, wherein a curve A is for direct intensification and a curve B is for reverse intensification. The intensified pictures have a light output $L_2$ which is much higher than the light input $L_1$ when the light input is in a critical range which varies slightly with the thickness of the component layers and materials of the image converting panel. Therefore, it is necessary, in order to produce sufficiently intensified pictures to control the intensity of light input. The intensity of light input depends upon whether the reproduced pictures are intensified directly or reversely and varies with the tone of the films as well as the characteristics of the image converting panel. The light input can be controlled by a light intensity controller 3 which controls the electric current flowing through the light source 4, or by a control means in the form of an iris diaphragm 29, or a combination thereof. A preferred method for controlling the light input is to employ a so-called electric eye device such as that used with a photographic camera. Said electric eye device comprises a photoconductive element for measuring the intensity of light input and an automatic diaphragm controller coupled with the photoconductive element, and can facilitate continuous production of a suitable light input $L_1$ regardless of the tones of the film.

The reproduced pictures are intensified and the non-uniformity of the pictures is emphasized when they are projected on the image converting panel. It is necessary for producing satisfactory pictures that the projecting lens 24 be superior in resolution and uniformity of light transmission over all the lens. A good projecting lens is, for example, a lens which has the characteristics F: 1.5 to F: 2.8 aperture and $f$: 50 mm. focus, such as is manufactured by Minolta Camera Corporation of Japan.

A synchronous turning prism 25 having a small number of sides, such as a square, is apt to cause a variation in the light input projected onto the image converting panel during rotation of the prism. The variation is increased when the synchronous turning prism 25 is turned slowly or irregularly, for example, by manual operation. The variation results in non-uniformity of the reproduced pictures and makes it difficult to inspect details of the pictures. The variation can be decreased by employing a synchronous turning prism having at least eight sides, such as an octagon, a dodecagon or a polygon with a higher number of sides. However, it is difficult to eliminate the variation completely so long as the synchronous turning prism is used. There is an inherent tendency for the light input to increase when the synchronous turning prism stands still, whereas it decreases during turning of the prism.

Figure 7:
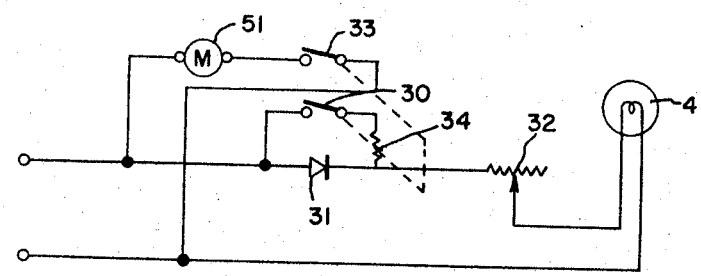
FIG. 7 is a circuit diagram for a light intensity controller adapted for a film editing apparatus.

The variation in the light intensity as between the time said prism 25 is turning and the time it is at rest can be completely eliminated by the light control means according to the invention as shown in FIG. 7.

Referring to FIG. 7, a series of circuits consisting of a relay switch 30 and a resistor 34 is connected in parallel with a diode 31. The light source 4 is connected to the terminal of an AC power source through a variable resistor 32 (0–100Ω; 25 w.) and said diode 31 (e.g., catalog No. 1S 152; Nippon Electric Corporation). Said light source 4, said variable resistor 32 and said diode 31 are connected in series with each other. Said relay switch 30 is coupled with a switch 33 which completes a circuit for driving a motor 51 for transferring film and turning said synchronous prism 25. When said motor 51 is stopped so as to stop transferring film by the opening of said switch 33, said relay switch 30 coupled to the switch 33 is opened and said light source 4 is then supplied with electric current only through said diode 31 and said variable resistor 32. When the motor circuit is closed to cause said motor 51 to turn so as to transfer film by the closing of said switch 33, the electric current flowing through said light source 4 is controlled by said variable resistor 32 and the parallel connected diode 31 and resistor 34. By controlling the characteristics of said resistor 34 and said diode 31, which has a half-wave rectifying action, the light intensity of said light source 4 can be changed so that it is one intensity during the time when said motor 51 turns and is another intensity at the time when said motor 51 is stopped, and the intensities can be made to be such that the light input projected on the image converting panel does not vary whether said motor 51 is turning or is stopped. Therefore, by providing for a decreased light intensity at the time when the film is standing still, the film can be prevented from overheating.

Any suitable resistor can be used in place of said diode 31 but is inferior to a diode as regards the heat loss thereof.

The power source 7 for the image panel can be any power source which is able to supply two voltages with a phase and frequency suitable for giving the necessary characteristics, for example, electrical properties, brightness and lift, to the image converting panel of the invention.

Referring again to FIG. 3, the direct intensification can be effected by applying an AC voltage $V_1$ across the first transparent electrode 10 and a parallel grid electrodes 14 and by providing an open circuit between the two transparent electrodes 10 and 17. An improved contrast of reproduced pictures can be obtained by applying across the electrodes 10 and 17 an AC voltage $V_2$ of the opposite phase to that of the AC voltage $V_1$. The reverse intensification can be produced by applying an AC voltage $V_2$ across the two transparent electrodes 10 and 17 and by short circuiting the first transparent electrode 10 and the parallel grid electrode 14. An improved contrast of reversely intensified pictures can be obtained by applying across the transparent electrode 10 and the parallel grid electrode 14 an AC voltage $V_1$ having a phase opposite of that of the AC voltage $V_2$.

The frequency and size of voltages $V_1$ and $V_2$ depend upon the characteristics of the image converting panel, especially upon the dielectric properties thereof. It is necessary in order to hold a definite brightness of the reproduced pictures that the lower frequency be used with a higher voltage, because variation in the brightness is proportional to both the frequency and voltage supplied to the electroluminescent layer. The low voltage increases the life of the image converting panel but impairs the clarity and the brightness of the reproduced pictures. A high voltage improves the brightness but reduces the life of the image converting panel due to dielectric breakdown. Therefore, it is necessary to select a frequency and size for voltages $V_1$ and $V_2$ to balance the brightness and the life that is required. Examples of specific voltages which will give reproduced pictures of superior quality on the image converting panel having the construction described above are as follows: for direct intensification, $V_1$ is about 350 v. and 1 kc./sec. or 250 v. and 5 kc./sec. and the $V_2$ is 0, i.e., there is open circuit across the electrodes 10 and 17 or is up to 400 v. and has a phase opposite to that of $V_1$; for reverse intensification, $V_2$ is 1800 v. and 1 kc./sec. or 1200 v. and 5 kc./sec. and the $V_1$ is 0, i.e., electrodes 10 and 14 are short circuited or is up to 400 v. and has a phase opposite to that of $V_2$.

A conventional power source is apt to be rather large in size when it is required to supply two AC voltage at a high apparent power at the same time. The large size is not desirable for miniaturizing the film editing apparatus. A miniaturized power source suitable for the film editing apparatus and in accordance with the invention is shown in FIG. 8.

The novel power source according to the invention comprises an all transistorized self-oscillator system which utilizes various interelectrode capacitances of the image converting panel as a part of the tuning capacitance thereof. In the self-oscillator system, the secondary coil of an output transformer forms a tuning circuit which uses the interelectrode capacitance of the image converting panel as part of the tuning capacitance. The self-oscillator system can reduce the amount of electric power needed by compensating for the apparent power needed for operating the image converting panel, and consequently can make it possible to reproduce stable pictures on the image converting panel. The novel source comprising the self-oscillator system can be constructed so that it has a size less than one tenth of a conventional power source and can easily facilitate both direct intensifying and reverse intensifying as well as adjusting of the contrast of reproduced pictures by the operation of only two switches attached thereto.

Figure 8:
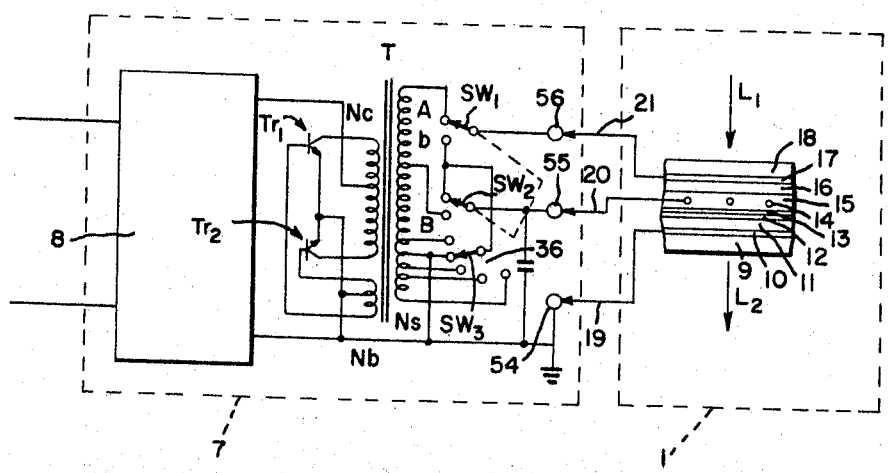
FIG. 8 is a circuit diagram of a power supply means connected to the image converting panel.
Figure 9:
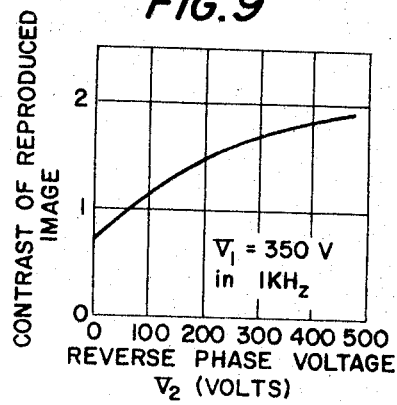
FIG. 9 is a graph illustrating the contrast of images directly reproduced on the image converting panel as a function of the AC voltage $V_2$ applied across the two transparent electrodes of the image converting panel when the AC voltage $V_1$ is constant.
Figure 10:
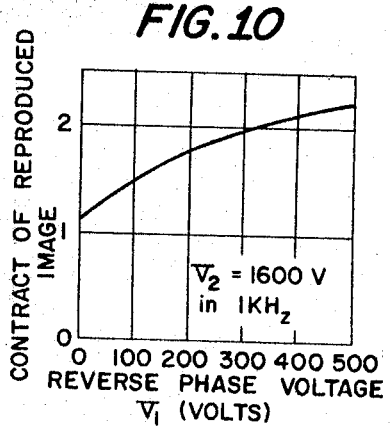
FIG. 10 is a graph illustrating the contrast of images reproduced in reversely intensified form on the image converting panel as a function of the AC voltage $V_1$ applied across the first transparent electrode and a parallel grid electrode of the image converting panel when the AC voltage $V_2$ is constant.

Referring to FIG. 8, reference character $Tr_1$ and $Tr_2$ are transistors for oscillating, and are in a push-pull type of connection. A collector winding $Nc$, a base winding $Nb$ and a secondary winding $Ns$ are provided for an output transformer T. The bases of said transistors are connected to the opposite ends of base winding $Nb$, the collectors are connected to the opposite ends of collector winding $Nc$, and the emitters are connected directly to each other. Said transistors $Tr_1$ and $Tr_2$ and said output transformer T form a self-oscillator which is connected to a conventional DC stabilized power source 8 by taps from the middle portions of windings $Nc$ and $Nb$. The voltages $V_1$ and $V_2$ according to this invention are supplied to the image converting panel through terminals 54, 55 and 56 having the lead wires 19, 20 and 21 connected thereto, respectively. Switches $Sw_1$ and $Sw_2$ are ganged with each other by means 35 to produce a reverse intensification when they contact the contacts A and to produce direct intensification when they contact the contacts B. The contacts A of switch $Sw_1$ and B of switch $Sw_2$ are connected to one end of secondary coil $Ns$ and a tap therefrom, respectively, while contacts B of switch $Sw_1$ and A of switch $Sw_2$ are connected to switch $Sw_3$ (36). Switch 36 ($Sw_3$) can be moved to contact any one of several taps from coil $Ns$ to supply any one of several voltages of the same or the opposite phase as the voltage between contacts A and B of switches $Sw_1$ and $Sw_2$ to said image converting panel for improving the contrast of reproduced pictures. The aforesaid electrodes of the image converting panel can be supplied with voltages suitable for reproducing pictures by providing an appropriate number of turns for said windings $Nc$, $Nb$ and $Ns$ and positioning the taps of the windings appropriately depending on the interelectrode capacitances. In such a way the desired direct intensification or reverse intensification can be easily effected by operating said switch 35, comprising the two switches $Sw_1$ and $Sw_2$ coupled with each other, and the contrast of reproduced pictures can be controlled by said switch 36 ($Sw_3$) without changing the brightness. The contrast of the reproduced pictures is defined by a slope of the curve of light input vs. light output shown in FIG. 6 and depends upon the voltage of the opposite phase, i.e. $V_2$ for direct intensification and $V_1$ for reverse intensification. FIG. 9 shows an example of variation in the contrast for direct intensification when $V_1$ is 350 v. and 1 kc./sec. and FIG. 10 shows an example of variation in the contrast for reverse intensification when $V_2$ is 1600 v. and 1 kc./sec.

Figure 12:
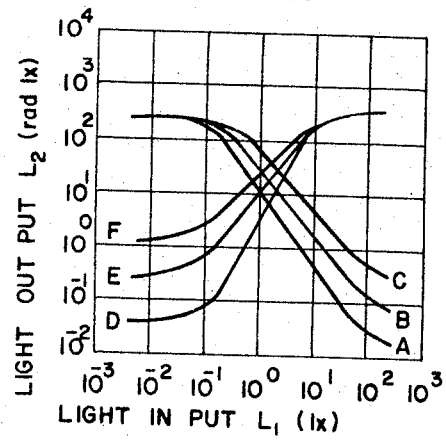
FIG. 12 is a graph illustrating light output relative to light input as a function of the electric resistance of the variable resistor used as a contrast controller in the circuit shown in FIG. 11.
Figure 11:
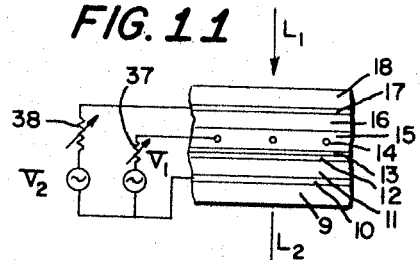
FIG. 11 is a circuit diagram showing a contrast controller system for reproduced images coupled to the image converting panel, which is shown in cross section.

The contrast of the reproduced pictures can also be improved by a contrast controller comprising two resistors. Referring to FIG. 11, variable resistors 37 and 38 having a resistance range from 0 to 10K$\Omega$ are connected between the first transparent electrode 10 and the parallel grid electrode 14 and between the two transparent electrodes 10 and 17, respectively. It will be obvious from FIG. 12 that an increase in the resistance of said resistor 37 makes the light input vs. light output curve shift upwards from a curve A through a curve B to a curve C which is the lowest contrast of the reversely intensified picture as among the curves A, B and C, while an increase in the resistance of said resistor 38 makes the light input vs. a light output curve shift upwards from a curve D through a curve E to a curve F and produces a lower contrast of the directly intensified pictures. The fine adjustment of the contrast can be effected by said variable resistors 37 and 38 and by a voltage selector switch such as the switch $Sw_3$ and an appropriate voltage source.

A film editing apparatus according to the invention can be constructed in a miniature size and can be transistorized which facilitates its being operated promptly as soon as the main switch is turned on. There is no need for the transistorized device to have a period of time necessary for warming up conventional components and the operation life of the novel power source can be prolonged.

A specified embodiment of the invention will be described with reference to FIG. 2 and should not be construed as limitative.

Figure 2:
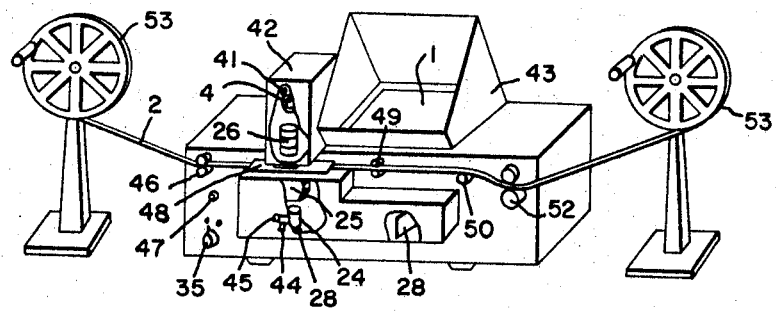
FIG. 2 is a perspective view of a film editing apparatus defined in FIG. 1.

Optical means 5 according to the invention can be incorporated in the novel film editing apparatus in a way similar to that in which it is used in prior art film projecting and editing apparatus, the novel film editing apparatus being shown in FIG. 2, wherein a light bulb 4 combined with a light converging mirror 41 is mounted in a lamp housing 42 and has positioned along the optical axis thereof a condenser lens 26, a synchronous turning prism 25, a projecting lens 24 and a reflective mirror 28. An iris diaphragm control means 29 and a focus control means are attached to said projecting lens 24 and are operated externally by knobs 44 and 45 installed on the front face of apparatus. The light intensity controller 3 according to the invention is electrically connected to said light bulb 4 and is operated by a knob which is mounted on a side of the apparatus and is not shown in FIG. 2. Prior art film guiding and rewinding means 6 can also be used. The film 2 transferred by a winding means 53 passes through film supporting and transferring rollers 46, 49, 50 and 52 and passes under a film holding plate 48 which presses the film down slightly.

The film winding means 53 is illustrated in FIG. 2 as a manual device, but is not to be restricted to a manual device. In a conventional projector, the film winding means 53 can be operated by an electric motor provided with a switch 33 which is ganged with the guide roller 52. A relay switch 30 coupled with the switch 33 is used to control the electric current flowing through the light bulb 4 as shown in FIG. 7. For electric operation of said film winding means 6, aforesaid film supporting rollers 52 can be coupled with said switch 33 so as to supply the electric current to the electric bulb 4 only when the film 2 is transferred.

The image converting panel 1 having a construction as shown in FIG. 4 is mounted in the top face of the novel apparatus and is provided with a light hood 43 for preventing undesirable external light from falling on the panel. A power source 7 having the construction described above is mounted in the apparatus and is connected to lead wires 19, 20 and 21 of the image converting panel 1 in the way described above. The main switch of the power source 7 is constructed in such a way that the main switch automatically actuates the operation of the power source 7 while pressing the film 2 down by means of the film pressing plate 48. An indicating lamp 47 in the front face indicates energization of said power source 7. A switch 35 is positioned on the front face and is used to select the operation for direct intensifying and reverse intensifying of pictures on the film in the manner described above in connection with the power source 7. The contrast of the reproduced pictures is controlled in the way described above by a switch 36 mounted on the side face of the apparatus.

What is claimed is:

1. A film editing apparatus capable of directly and reversely intensifying images of films, which comprises an image converting panel consisting of a glass plate, a first transparent electrode on said glass plate, an electroluminescent layer having an electroluminescent material on said first transparent electrode, a reflective layer on said electroluminescent layer, an opague layer on said reflective layer, a photoconductive layer containing photoconductive material having a response time lower than 50 msec. on said opague layer, a parallel grid electrode embedded in said photoconductive layer, a transparent dielectric layer having a transparent film therein on said photoconductive layer, second transparent electrode on said dielectric layer and a second glass plate on said second transparent electrode; a light source having a light intensity controller; and optical means receiving light from said light source and shining it through and enlarging images on a film and projecting the enlarged images on said photoconductive layer of said panel through the second transparent electrode and the transparent dielectric layer of said image converting panel, said optical means having lenses and a prism which pass all effective light wave-lengths of the spectral response characteristic of said photoconductive material; film transferring, guidance and rewinding means guiding a film through said optical means; a power source coupled to said panel and supplying AC voltages across said two transparent electrodes and across said first transparent electrode and said parallel grid electrode so as to reproduce images on said electroluminescent layer; and a contrast controller in said power source for adjusting the tones of said reproduced images.

2. A film editing apparatus as claimed in claim 1 in which said reflective layer contains barium titanate powder.

3. A film editing apparatus as claimed in claim 1 in which said opaque layer has carbon powder therein.

4. A film editing apparatus as claimed in claim 1, wherein said photoconductive material consists of 65 to 100% by weight of CdSe and 0 to 35% by weight of CdS and has a spectral response having effective wave lengths of 0.6 to 1.1$\mu$.

5. A film editing apparatus as claimed in claim 1, wherein said parallel grid electrode is a set of parallel tungsten wires spaced from each other a distance of from 300 to 600$\mu$, said tungsten wires having a diameter of from about 5 to 15$\mu$.

6. A film editing apparatus as claimed in claim 1, wherein said transparent dielectric layer consists of transparent organic silicon polymer and transparent insulating film.

7. A film editing apparatus as claimed in claim 6, wherein said transparent dielectric layer has a thickness less than 80$\mu$ and consists of a transparent dielectric film of a material selected from the group consisting a polyethylene terephthalate and a polycarbonate, and a pair of transparent films of a dielectric material selected from the group consisting of silicon rubber and silicon resin between which is sandwiched said firstmentioned transparent dielectric film.

8. A film editing apparatus as claimed in claim 1, wherein said optical means comprises a condenser lens, a synchronous turning prism having at least eight sides, a projecting lens and an iris diaphragm control means between said turning prism and said projecting lens.

9. A film editing apparatus as claimed in claim 1, wherein said light intensity controller comprises a diode, a series connected relay switch and a resistor connected in parallel to said diode and a variable resistor connected between said diode and the light source, a further switch with which said relay switch is operatively coupled, for driving a motor in said film transferring, guidance and rewinding means and coupled to said prism for turning it, said further switch being coupled to said motor for energizing said motor, said diode and said resistor controlling the electric current flowing through said light source so as to keep the light intensity projected on the image converting panel when said film moves and when said film stops the same.

10. A film editing apparatus as claimed in claim 1, wherein said light source is a tungsten lamp, a xenon lamp, and iodine lamp or a strobe lamp.

11. A film editing apparatus as claimed in claim 1, wherein said power source is a self-oscillator circuit which is coupled to said panel for utilizing the interelectrode capacitance of said image converting panel as a part of the tuning capacitance for oscillation.

12. A film editing apparatus as claimed in claim 11, wherein said self-oscillator circuit comprises a secondary winding of an output transformer, said secondary winding having taps, ganged switches connected between said taps and said two transparent electrodes and to said parallel grid electrode of said image converting panel so as to provide said image converting panel simultaneously with two AC voltages $V_1$ and $V_2$, said voltage $V_1$ being applied across first transparent electrode and said parallel grid electrode, and said voltage $V_2$ being applied across said first transparent electrode and second transparent electrode.

13. A film editing apparatus as claimed in claim 1 wherein said power source comprises a stabilized DC power source, an output transformer having a collector winding, a base winding and a secondary winding, first and second transistors having the bases thereof connected to the ends of said base winding, the collectors thereof connected to the ends of the collector winding, and the emitters thereof connected to each other in push-pull configuration, the middle portions of said base winding and collector windings having taps connected to said DC source, two switches each having two contacts, the one contact on one switch and the other contact on the other switch connected across part of said secondary winding, and the other contact of the one switch and the one contact of the other switch being connected, the outputs of said switches being connected to the said second transparent electrode and said parallel grid electrode respectively, and a third switch having a switch member connected to the said other contact of the one switch and the one contact of the other switch and having a plurality of contacts engageable with the said switch member, said plurality of contacts being connected to said secondary winding for taking off a plurality of different voltages, and a connection from said DC power source directly to said one transparent electrode.

References Cited

UNITED STATES PATENTS

| | | | |
|---|---|---|---|
| 1,880,289 | 10/1932 | Sukumlyn | 250—49.5 |
| 3,131,303 | 4/1964 | Chitayat | 88—24 |

NORTON ANSHER, *Primary Examiner.*

MONROE H. HAYES, *Assistant Examiner.*

U.S. Cl. X.R.

353—21.